United States Patent
Wang

(10) Patent No.: US 11,347,018 B2
(45) Date of Patent: May 31, 2022

(54) LENS MODULE

(71) Applicant: AAC Technologies Pte. Ltd., Singapore (SG)

(72) Inventor: Hailong Wang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 249 days.

(21) Appl. No.: 16/526,949

(22) Filed: Jul. 30, 2019

(65) Prior Publication Data

US 2020/0057236 A1 Feb. 20, 2020

(30) Foreign Application Priority Data

Aug. 15, 2018 (CN) .......................... 201821318267.5

(51) Int. Cl.
G02B 7/02 (2021.01)

(52) U.S. Cl.
CPC .................................... G02B 7/021 (2013.01)

(58) Field of Classification Search
CPC . G02B 7/00; G02B 7/02; G02B 7/021; G02B 7/022; G02B 7/026; G02B 7/027
See application file for complete search history.

(56) References Cited

U.S. PATENT DOCUMENTS

| | | | |
|---|---|---|---|
| 2011/0102901 A1* | 5/2011 | Lin | G02B 7/022 359/601 |
| 2013/0050850 A1* | 2/2013 | Lin | G02B 7/021 359/738 |
| 2014/0029114 A1* | 1/2014 | Kim | G02B 7/021 359/709 |
| 2015/0241656 A1* | 8/2015 | Choi | G02B 13/0045 359/738 |
| 2015/0260941 A1* | 9/2015 | Yan | G02B 7/021 359/771 |
| 2015/0260942 A1* | 9/2015 | Yan | G02B 7/021 359/771 |

* cited by examiner

Primary Examiner — Ephrem Z Mebrahtu
(74) Attorney, Agent, or Firm — W&G Law Group

(57) ABSTRACT

Provided is a lens module, including a lens barrel and a lens group. The lens barrel includes a first barrel wall and a second barrel wall. The lens group at least include a first lens and a second lens. The first barrel wall has an image-side surface, including a first planar surface horizontally extending from a joint between the first barrel wall and the second barrel wall towards an optical axis, a protruding portion connected to the first planar surface and protruding towards the first lens, and a second planar surface horizontally extending from the protruding portion towards the optical axis. The first lens has a first peripheral portion, including a third planar surface, a recess portion connected to the third planar surface and a fourth planar surface connected to the recess portion. The protruding portion is attached to the recess portion.

6 Claims, 2 Drawing Sheets

LENS MODULE

TECHNICAL FIELD

The present disclosure relates to the field of camera lenses, and in particular to a lens module.

BACKGROUND

With the constant development of science and technology, electronic devices have become more and more intelligent. In addition to digital cameras, portable electronic devices, such as tablet PCs and mobile phones, are also equipped with lens modules. To meet the needs of people for usage, a higher requirement is also raised on the quality of an object image captured by the lens module.

However, in the existing structure of a lens, a glass lens is required to match the lens barrel or other components in view of the precision of outer diameter. At the same time, the combination manner for the glass lens is an ever-existing difficult problem, and the overall performance of the lens may be affected once the matching roundness of the glass lens is poor. There is still much room for improvement in the existing matching manners. Therefore, it is urgent to provide a novel lens module to achieve higher matching stability between the glass lens and the respective components, and to improve the overall performance of the lens.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be further illustrated with reference to the accompanying drawings and the embodiments. In the embodiments described below, a direction defined by left and right sides of paper is referred to as a horizontal direction, and a direction defined by upper and lower sides of the paper and perpendicular to the horizontal direction is referred to as a vertical direction. In the present disclosure, a direction of a central axis is parallel to the vertical direction.

Embodiment 1

Figure 1:
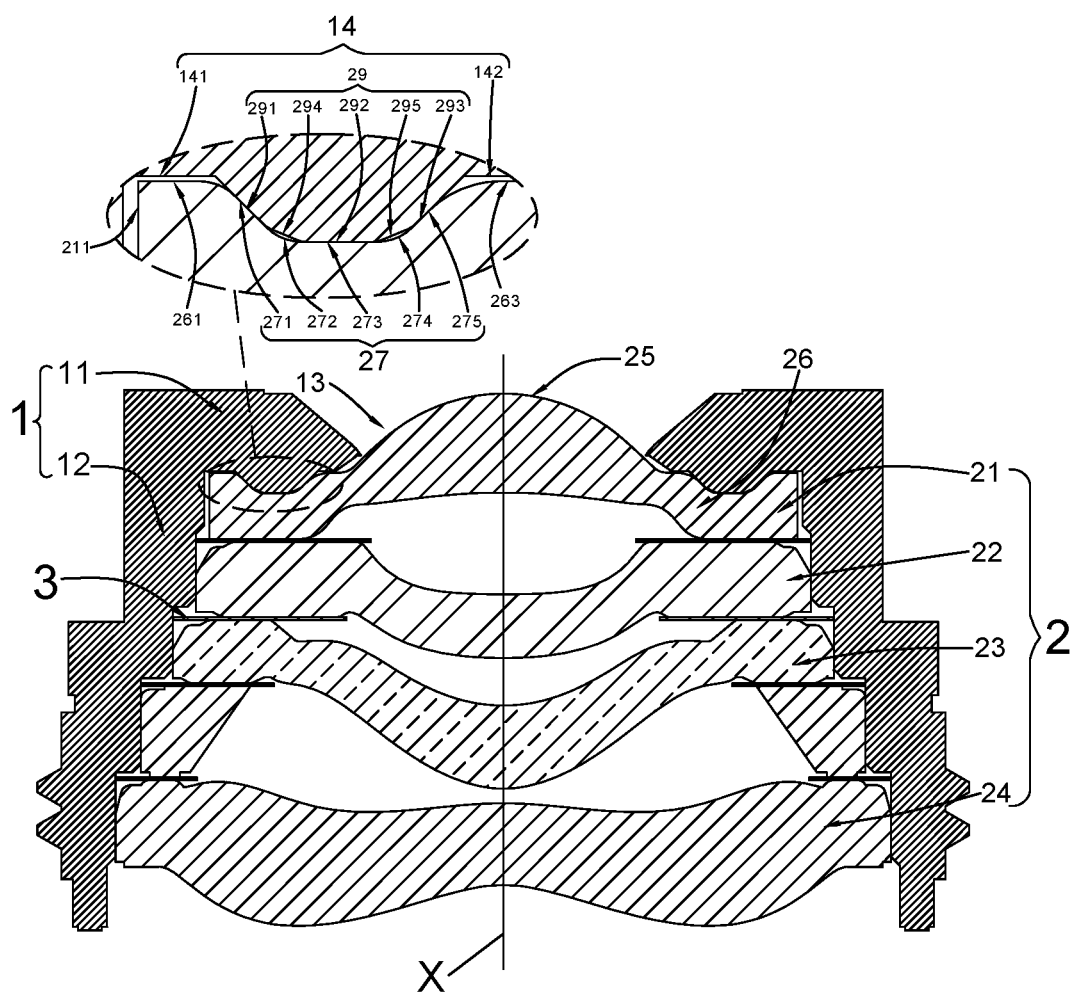
FIG. 1 is a cross-sectional view showing a structure of a lens module according to the present disclosure.

As shown in FIG. 1, the present disclosure provides a novel lens model. The lens module includes a lens barrel 1 and a lens group 2 accommodated in the lens barrel 1. The lens group 2 includes a first lens 21 and a second lens 22, which are arranged in sequence along a direction from an object side to an image side of the lens barrel 1.

Figure 2:
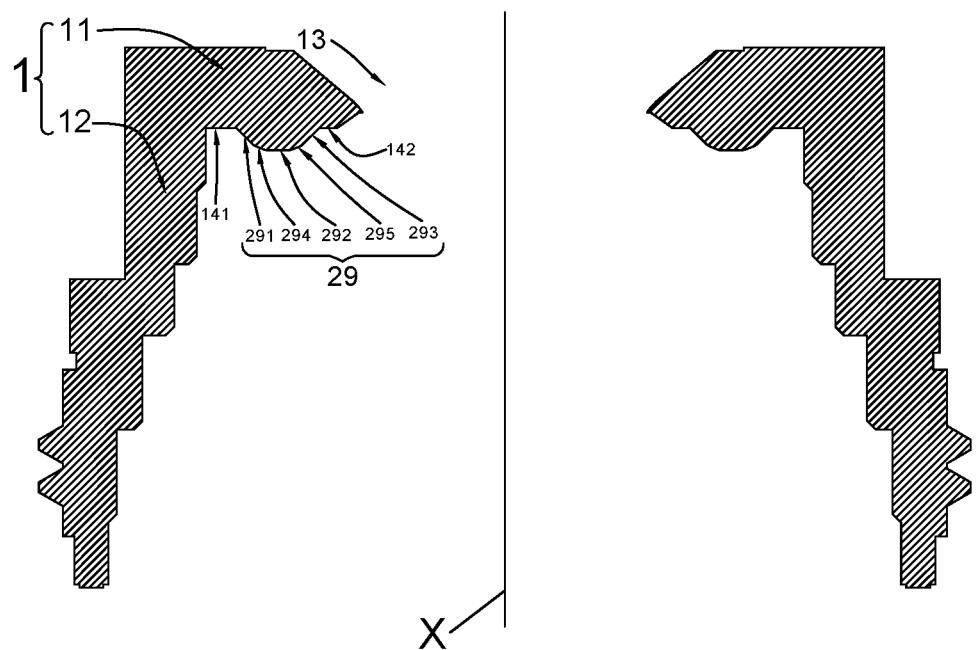
FIG. 2 is a cross-sectional view showing a structure of a lens barrel according to the present disclosure.

In the embodiment shown in FIG. 2, the lens barrel 1 includes a first barrel wall 11 forming a light through hole 13 and extending in a horizontal direction, a second barrel wall 12 extending from the first barrel wall 11 while being bent, and a receiving space defined by the first barrel wall 11 and the second barrel wall 12. The first barrel wall 11 includes a first surface close to the object side and a second surface close to the image side. The lens barrel 1 may be either an integral structure or a split structure.

As shown in FIG. 1, the lens group 2 includes a first lens 21, a second lens 22, a third lens 23 and a fourth lens 24, which are matched each other along a direction from the object side to the image side of the lens barrel 1. The first lens includes a first optical portion 25 and a first peripheral portion 26 surrounding the first optical portion 25, and other lenses are each provided with the optical portion and the peripheral portion surrounding the optical portion. The first lens 21 is a glass lens. The second lens 22, the third lens 23 and the fourth lens 24 may be either glass lenses, or plastic lenses or lenses made of other materials. In addition, the number of the lenses in the lens group 12 is not limited to four. In addition, a light-shading sheet may be either disposed among the lenses or omitted.

In order to further increase the matching roundness between the first lens and the lens barrel 1 and the overall assembly performance, the matching structure between the first lens 21 and the lens barrel 1 is modified, which is described in detail as follows.

As shown in FIGS. 1 and 2, the second surface of the first barrel wall 11 includes a first matching portion 14 matching the first lens 21. The first matching portion 14 includes a first planar surface 141 horizontally extending from a joint between the first barrel wall 11 and the second barrel wall 12 in a direction facing towards the optical axis, a protruding portion 29 connected to the first planar surface and protruding towards the first lens 21, and a second planer surface 142 horizontally extending from the protruding portion 29 towards the optical axis. For example, the protruding portion 29 includes a first oblique surface 291 obliquely extending from the first planar surface 141 towards the optical axis and towards the image side, a first arcuate transition surface 294 connected to the first oblique surface 291, a fifth planar surface 292 horizontally extending from the first arcuate transition surface 294 towards the optical axis X, a second arcuate transition surface 295 connected to the fifth planar surface 292, and a second oblique surface 293 obliquely extending from the second arcuate transition surface 295 towards the optical axis X and towards the object side. The second oblique surface 293 is connected to the second planar surface 142.

Further, the first oblique surface 291 has a gradient either equal or unequal to that of the second oblique surface 293. A first included angle $\alpha$ is formed between the first oblique surface 291 and the optical axis X, and is preferably an acute angle. A second included angle $\beta$ is formed between the second oblique surface 293 and the optical axis X, and is preferably an acute angle.

Figure 3:
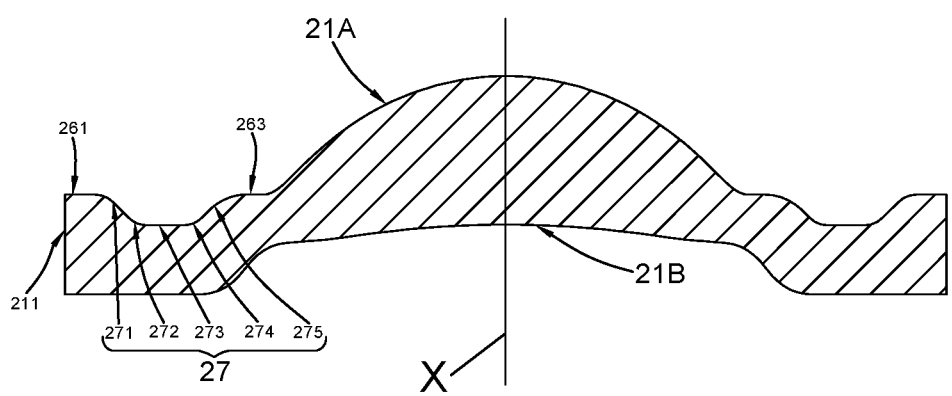
FIG. 3 is a cross-sectional view showing a structure of a first lens according to the present disclosure.

Further, as shown in FIG. 3, the first lens 21 has a symmetric structure, and thus merely the left part of the first lens 21 is illustrated. The first lens 21 has an upper surface as an object side surface 21A, and a lower surface as an image side surface 21B. The first peripheral portion 26 of the first lens 21 includes a third planar surface 261 horizontally extending from an outer edge of the first peripheral portion 26 in the direction facing towards the optical axis, a recess portion 27 connected to the third planar surface 261, and a fourth planar surface 263 connected to the recess portion 27.

Further, the recess portion 27 is a concave surface formed by recessing from the object side surface 21A towards the image side surface 21B of the first lens 21. The recess portion 27 has a length in a horizontal direction, which gradually decreases along a recess depth (i.e. the vertical direction or the direction of the optical axis X). For example, the recess portion 27 includes a third oblique surface 271 obliquely extending from the third planar surface 261 towards the optical axis X and towards the image side, a third arcuate transition surface 272 connected to the third oblique surface 271, a sixth planar surface 273 horizontally extending from the third arcuate transition surface 272 towards the optical axis X, a fourth arcuate transition surface 274 connected to the sixth planar surface 273, and a fourth oblique surface 275 obliquely extending from the fourth arcuate transition surface 274 towards the optical axis X and towards the object side. The fourth oblique surface 275 is connected to the fourth planar surface 263. The third planar surface 261 is connected to the third planar surface 271 through an arcuate transition, and the fourth oblique surface 275 is connected to the fourth planar surface 263 through an arcuate transition.

As it can be seen in FIG. 1, the protruding portion 29 is attached to the recess portion 27. For example, the first arcuate transition surface 294 and the third arcuate transition surface 272 are spaced apart, and the second arcuate transition surface 295 and the fourth arcuate transition surface 274 are spaced apart; the sixth planar surface 273 is attached to the fifth planar surface 292; the third oblique surface 271 is attached to the first oblique surface 291, and the fourth oblique surface 275 is attached to the second oblique surface 293.

Further, the first lens 21 has an outer-edge end surface 211 spaced apart from an inner wall surface of the first barrel wall 11 by a certain distance; the first planar surface 141 and the third planar surface 261 are spaced apart, and/or the second planar surface 142 and the fourth planar surface 263 are spaced apart. However, in other embodiments, the first planar surface 141 is partially attached to the third planar surface 261, and/or the second planar surface 142 is partially attached to the fourth planar surface 263. In addition, the first planar surface 141 and the second planar surface 143 are located either on the same plane or on different planes; and the third planar surface 261 and the fourth planar surface 263 may be located either on the same plane or on different planes.

In the present disclosure, the first lens 21 and the lens barrel 1 can be positioned and assembled simply by a concave-convex matching structure formed by matching the protruding portion 29 and the recess portion 27, such that a better matching roundness and a higher matching stability and assembly stability can be realized. In addition, the matching structure described above is more advantageous for the size adjustment of the matching portion, thereby stabilizing the matching and improving the overall performance of the lens to a certain extent.

In addition, light-shading members 3 are disposed between the first lens 21 and the second lens 22, between the second lens 22 and the third lens 23 and between the third lens 23 and the fourth lens 24, respectively. The light-shading members 3 are positioned and assembled in the lens barrel 1. The light-shading member 3 can be a light-shading sheet or plate for absorbing stray light, and the light-shading sheet and the light-shading plate can be either disposed at the same time or omitted. The second lens 22 and the third lens 23 are fixed by pressing each other, the outer edge of the image side surface of the fourth lens 24 is fixed by dispensing an adhesive or pressing a ring thereby fixing all the lenses within the lens barrel 1. It should be noted that the number of the lenses in the lens group is not limited thereto, and any two of the lenses can be positioned and assembled in other positioning manners.

Compared with the prior art, the lens module provided by the present disclosure has better matching roundness and higher matching stability through a concave-convex matching structure formed by the protruding portion of the lens barrel and the recess portion of the first lens, thereby improving the overall performance of the lens to a certain extent.

It should be noted that, the above are merely embodiments of the present invention. Any improvement made by those skilled in the art without departing from the inventive concept of the present invention shall fall within the protection scope of the present invention.

What is claimed is:

1. A lens module, comprising:
a lens barrel; and
a lens group received in the lens barrel,
wherein the lens barrel comprises a first barrel wall extending in a horizontal direction and a second barrel wall extending from the first barrel wall while being bent, the first barrel wall comprising a first surface close to an object side and a second surface close to an image side,
the lens group at least comprises a first lens and a second lens that are arranged from an object side to an image side, the first lens being a glass lens and comprising a first optical portion and a first peripheral portion surrounding the first optical portion,
wherein the second surface of the first barrel wall comprises:
a first planar surface horizontally extending from a joint between the first barrel wall and the second barrel wall towards an optical axis;
a protruding portion connected to the first planar surface and protruding towards the first lens; and
a second planar surface horizontally extending from the protruding portion towards the optical axis,
wherein the first peripheral portion comprises:
a third planar surface horizontally extending from an outer edge of the first peripheral portion towards the optical axis;
a recess portion connected to the third planar surface; and
a fourth planar surface connected to the recess portion, and
wherein the protruding portion is attached to the recess portion, wherein the protruding portion comprises: a first oblique surface obliquely extending from the first planar surface towards the optical axis and towards the image side; a first arcuate transition surface connected to the first oblique surface; a fifth planar surface horizontally extending from the first arcuate transition surface towards the optical axis; a second arcuate transition surface connected to the fifth planar surface; and a second oblique surface obliquely extending from the second arcuate transition surface towards the optical axis and towards the object side, the second oblique surface being connected to the second planar surface, wherein the recess portion comprises: a third oblique surface obliquely extending from the third planar surface towards the optical axis and towards the image side; a third arcuate transition surface connected to the third oblique surface; a sixth planar surface horizontally extending from the third arcuate transition surface towards the optical axis; a fourth arcuate transition surface connected to the sixth planar surface; and a fourth oblique surface obliquely extending from the fourth arcuate transition surface towards the optical axis and towards the object side, the first arcuate transition surface is spaced apart from the third arcuate transition surface, the second arcuate transition surface is spaced apart from the fourth arcuate transition surface, and the sixth planar surface is attached to the fifth planar surface.

2. The lens module as described in claim 1, wherein the recess portion has a length in the horizontal direction that gradually decreases along a recess depth.

3. The lens module as described in claim 1, wherein the first oblique surface has a gradient equal to that of the second oblique surface.

4. The lens module as described in claim 1, wherein the third oblique surface is attached to the first oblique surface, and the fourth oblique surface is attached to the second oblique surface.

5. The lens module as described in claim 1, wherein the third planar surface is connected to the third oblique surface through an arcuate transition, and the fourth oblique surface is connected to the fourth planar surface through an arcuate transition.

6. The lens module as described in claim 1, wherein the first lens has an outer-edge end surface spaced apart from an inner wall surface of the lens barrel.

* * * * *